United States Patent
Syamakumari et al.

(10) Patent No.: US 9,850,337 B2
(45) Date of Patent: Dec. 26, 2017

(54) COMB-COIL SUPRAMOLECULAR CROSSLINKED POLYMER

(71) Applicant: COUNCIL OF SCIENTIFIC & INDUSTRIAL RESEARCH, New Delhi (IN)

(72) Inventors: Asha Syamakumari, Pune (IN); Rekha Narayan, Pune (IN); Shekhar Shinde, Pune (IN); Saibal Bhaumik, Pune (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 443 days.

(21) Appl. No.: 14/382,407

(22) PCT Filed: Mar. 4, 2013

(86) PCT No.: PCT/IN2013/000125
§ 371 (c)(1),
(2) Date: Sep. 2, 2014

(87) PCT Pub. No.: WO2013/128475
PCT Pub. Date: Sep. 6, 2013

(65) Prior Publication Data
US 2015/0111982 A1  Apr. 23, 2015

(30) Foreign Application Priority Data
Mar. 2, 2012 (IN) .............. 605/DEL/2012

(51) Int. Cl.
*C08F 271/02* (2006.01)
*C08K 5/3437* (2006.01)
*C08L 39/08* (2006.01)
*C08L 65/00* (2006.01)

(52) U.S. Cl.
CPC ......... *C08F 271/02* (2013.01); *C08K 5/3437* (2013.01); *C08L 39/08* (2013.01); *C08L 65/00* (2013.01); *C08G 2261/135* (2013.01); *C08G 2261/136* (2013.01); *C08G 2261/1642* (2013.01); *C08G 2261/1644* (2013.01); *C08G 2261/226* (2013.01);
(Continued)

(58) Field of Classification Search
CPC ..... C08F 271/02; C08K 5/3437; C08L 65/00; C08L 39/08; C08G 2261/1642; C08G 2261/1644; C08G 2261/135; C08G 2261/3422; C08G 2261/51; C08G 2261/76; C08G 2261/136; C08G 2261/226
See application file for complete search history.

(56) References Cited

PUBLICATIONS van Herrikhuyzen et al. ("Synthesis of n-Type Perylene Bisimide Derivatives and Their Orthogonal Self-Assembly with p-Type Oligo(p-phenylene vinylene)s" J. Am. Chem. Soc. 2004, 126, 10021-10027).*

(Continued)

*Primary Examiner* — Michael Pepitone
*Assistant Examiner* — Jessica Roswell
(74) *Attorney, Agent, or Firm* — Renner Kenner Greive Bobak Taylor & Weber (57) ABSTRACT

The present invention relates to a facile process for the preparation of non-covalently cross-linked self-assembled perylene bisimide nano structures using hydrogen bonding interactions with poly-4-vinyl pyridine or oligophenylene vinylene (OPV) as structural motif.

11 Claims, 9 Drawing Sheets

(52) U.S. Cl.
CPC ............... *C08G 2261/3422* (2013.01); *C08G 2261/51* (2013.01); *C08G 2261/76* (2013.01)

(56) References Cited

PUBLICATIONS

Jonkheijm et al. ("Control of Ambipolar Thin Film Architectures by Co-Self-Assembling Oligo(p-phenylenevinylene)s and Perylene Bisimides," J. Am. Chem. Soc. 2006, 128, 9535-9540).*

Müller et al. ("Multi-colour organic light-mitting displays by solution processing," Nature 2003, 421, 829-833).*

* cited by examiner

OPV in DMSOd6

Figure 8

Figure 9
a) Before curing (Complex)

B) After curing (Complex)

COMB-COIL SUPRAMOLECULAR CROSSLINKED POLYMER

TECHNICAL FIELD

The present invention relates to a facile process for the preparation of non-covalently cross-linked self-assembled perylene bisimide nano structures using hydrogen bonding interactions with poly-4-vinyl pyridine or oligophenylene vinylene (OPV) as structural motif.

BACKGROUND AND PRIOR ART

Perylene and naphthalene bisimides are two of the most widely studied π-conjugated molecules due to their tendency to form n-type (acceptor) semiconducting materials. Similarly, oligophenylene vinylene (OPV) is a well-studied p type (donor) semiconducting material. However, discrete one-dimensional nanoobjects based on these materials are still very rare despite their potential in nanotechnologies. Nanostructuring plays an important role in the device applications such as optoelectronics and photovoltaics; since the charge carrier mobility varies with various packing arrangements. Ideally, the donor and acceptor material should form a bicontinuous and interpenetrating network with an interfacial distance smaller than the exciton diffusion length (10-20 nm). Block copolymers have the potential to microphase separate and form well-defined arrays which are tens of nanometers in size.

J. Ruokolainen et. al in Macromolecules 1999, 32, 1152-1158 discloses a preparation of the polymeric materials i.e. supramolecular comb-coil diblock copolymers from amphiphilic compound i.e. 3-n-pentadecylphenol and polystyrene-block-poly(4-vinylpyridine) by the hydrogen bonding interactions between the pyridine group of poly(4-vinylpyridine) and hydroxyl group of 3-n-pentadecylphenol unit. Further, the polymeric materials are characterized by two length scales, "block copolymer length scale: 10-100 nm" and a shorter "nanoscale: ~3 nm".

Stefan M. Lindner et. al in Macromolecules 2004, 37, 8832-8835 discloses the synthesis of donor-acceptor block copolymer i.e. poly(vinyltriphenylamine)-b-poly(perylenebisimide acrylate) [PvTPA-b-PPerAcr] by subsequent polymerization of perylenebisimide acrylate and vinyltriphenylamine monomers in presence of o-dichlorobenzene at a temperature of 125° C. via nitroxide mediated radical polymerization.

The thin film field-effect transistors containing blend of poly-3-hexyl-thiophene (P3HT) and perylene diimide (PDI) is reported by Sreenivasa Reddy et. al in J. Mater. Chem. C, 2013.

Further, Qingling Zhang et. al in Macromolecules 2009, 42 (4), 1079-1082 discloses the preparation of donor-accepted diblock copolymer comprising poly(3-hexylthiophene) (rrP3HT) and poly(perylene diimide acrylate) (PPDA) useful for fabrication of solar cell. Further, the vinyl terminated rrP3HT is synthesized using Grignard metathesis polymerization and converted to polythiophene macroinitiator, which is then used in controlled free radical polymerization of a perylene diimide containing acrylate to give said donor-acceptor copolymer. The preparation of donor accepted diblock copolymer employs costly Grignard reagent and metal catalyst in presence of inert solvent.

Rancatore et. al in ACS, 2010, Vol. 4, No. 5, 2721-2729 discloses the fabrication of organic semiconductor-based devices using solution processing; wherein quarter thiophene organic semiconductor i.e. 5'''-(3,7-Dimethyloctyl)-5-(3-(3-hydroxyphenyl)propyl)-[2,2';5',2'';5'',2'''] quarter thiophene compound [4T] is attached to the side chains of block copolymer of poly(styrene)-block-poly(4-vinylpyridine) [PS-b-P4VP] by noncovalent hydrogen bonds to obtain supramolecular assemblies that act as p-type semiconductors in field-effect transistors.

From the aforementioned examples, the blending of low molecular weight perylene imides with thiophene polymers to prepare smooth films of field-effect transistors involves inherent problem of macrophase separation. Additionally, the preparation of supramolecular complexes and semiconductors involves cumbersome, hazardous chemicals and reagents, and lengthy process steps hence commercially not feasible.

Further, the use of perylene and naphthalene bisimides in applications such as organic field effect transistors and solar cells requires considerable effort to overcome their low intrinsic stability. Thus, the perylene bisimides when covalently tethered to a polymer back bone either in main chain or as side groups of block polymers gains in terms of solution processability and microphase separability, but looses in terms of intrinsic crystallinity of the small molecules.

In view of foregoing, there is need in the art for the facile organization of both n-type (i.e. acceptor materials) and p-type (i.e. donor materials) organic semiconductor materials in the form of an interpenetrating structure in the nano domain, thereby making efficient charge separation in device application of organic field effect transistors (OFET) and solar cells. Thus, the present invention overcomes the technical constraints by combining solution processability with crystallinity in perylene bisimide derivatives using supramolecular complexation of perylene bisimide derivatives to poly(4-vinyl pyridine) polymer via hydrogen bonding.

OBJECTIVE OF THE PRESENT INVENTION

The main objective of the present invention is to provide a facile process for the preparation of non-covalently cross-linked self-assembled perylene bisimide nano structures using hydrogen bonding interactions with poly-4-vinyl pyridine or oligophenylene vinylene (OPV) as structural motif.

SUMMARY OF THE INVENTION

Accordingly, the present invention relates to a facile process for the preparation of self-organized non-covalently cross-linked perylene-bisimide nanostructures comprising:
a) complexing the perylene bisimide derivative with poly-4-vinyl pyridine or oligophenylene vinylene (OPV) in presence of solvent under stirring for a period ranging between 2 to 24 hrs at a temperature of 30-60° C. to give comb-coil supramolecular complex;
b) Photoinitiated polymerization of comb-coil supramolecular complex as obtained in step (a) in presence of photoinitiator under UV radiation for a period ranging between 5-15 mins at interval ranging between 5-90 seconds using a DYMAX Blue wave 75 UV curing spot lamp provided with a light guide of 5 mm diameter and a 75 watt high pressure short-arc bulb with an initial lamp intensity of 19 W/cm$^2$ emitting primarily in the UVA and blue visible light range of 280-450 nm to obtain said self-organized cross-linked perylene bisimide nanostructures.

In an embodiment of the present invention the perylene bisimide derivative is selected from the group consisting of symmetrical pentadecylphenyl perylene bisimide [SPDP-PBI], and unsymmetrical pentadecylphenyl perylene bisimide.

In one embodiment of the present invention unsymmetrical pentadecylphenyl perylene bisimide is ethyl-hexyl pentadecylphenyl perylene bisimide [UEHPDP-PBI].

In another embodiment of the present invention unsymmetrical pentadecylphenyl perylene bisimide is alkyl or aryl methacrylate derivative of said pentadecylphenyl perylene bisimide.

In another embodiment of the present invention said OPV is unsymmetrical OPV with a H bonding group selected from —OH, —COOH at one end and a polymerizable group selected from acrylate or methacrylate group at the other end.

In yet another embodiment of the present invention the perylene bisimide possesses linear or branched C6-C20 alkyl chain at one end and the other end is an amino pyridine group.

In still another embodiment of the present invention solvent used is selected from the group consisting of chloroform, dichloromethane, dimethylformamide, tetrahydrofuran.

In still another embodiment of the present invention photoinitiator used is 2,2-diethoxy acetophenone.

In still another embodiment of the present invention mol ratio of perylene bisimide derivative and poly-4-vinyl pyridine or oligophenylene vinylene (OPV) is in the range of 1:0.25 to 1:1.

In still another embodiment of the present invention size of self-organized cross-linked perylene bisimide nanostructures is in the range of 5-15 nm.

DESCRIPTION OF DRAWINGS

FIG. 1 FTIR spectra of UEHPDP-PBI-P4VP and SPDP-PBI-P4VP complexes. FTIR was performed to study the complexation between Poly-(4-vinylpyridine) and the symmetrical (SPDP-PBI) and unsymmetrically (UEHPDP-PBI) substituted perylenebisimides containing hydrogen bondable moieties. The most affected bands of poly(vinylpyridines) are those concerned with the stretching modes of pyridine ring: 1597, 1413 and 993 cm$^{-1}$ for P4VP. Upon hydrogen bonding, these bands shift to higher frequencies. From FIGS. 1 (a) & (b) it is clear that in both the set of complexes UEHPDP-PBI and SPDP-PBI, the peak at 993 cm$^{-1}$ has almost fully vanished for the nominally fully complexed case (100% case) indicating that the complex formation is essentially complete.

FIG. 2 shows the concentration dependent solution state $^1$HNMR studies of the UEHPDPPBI-P4VP (1:1) complex in the concentration range of 1-15 mg/ml of CDCl$_3$ solvent. At the lowest concentration the system is similar to that of an extremely dilute perylenebisimide solution. When the concentration increased, the peaks corresponding to P4VP also started appearing and there was an evident overall broadening of peaks similar to that of a polymer and it reached maximum at the highest concentration studied which was attributed to the increase in dipolar interactions due to strong hydrogen bonding.

FIG. 3. exhibits the low angle x-ray diffraction patterns of neat P4VP in comparison with the pure amphiphiles UEHPDP-PBI and SPDP-PBI and their respective (1:1) complexes in the range 0.5 to 10 degrees 2theta value. The low angle peak corresponds to the packing along the molecular length. The symmetric two sided amphiphile SPDP-PBI showed an increase in the packing distance d for the 1:1 complex compared to the amphiphile itself. The hydrogen bonding interaction at the two extremities of the symmetrical molecule with the pyridyl nitrogen is attributed to this stretching and consequent expansion of the molecular length.

Whereas in the case of the unsymmetric amphiphile UEHPDP-PBI, the packing distance remained almost same in both cases viz., the complex as well as independent molecule.

FIG. 4 Solution state $^1$HNMR (400 MHz) spectra of UPDPHAPDP-PBI, P4VP and complex. $^1$HNMR spectra of UPDPHAPDP-PBI has a peak centered at 8.76 ppm corresponding to eight aromatic protons of perylene core, six aromatic protons of benzene ring appear in the region of 6.90 to 7.15 ppm. Three protons corresponding to acrylate moiety can be seen in the region 6.53 to 5.67 ppm as multiplate. The $^1$HNMR spectra of P4VP showed two peaks at 6.34 and 6.41 ppm in aromatic region corresponding to four protons of pyridine ring. To trace complex formation by $^1$HNMR, UPDPHAPDP-PBI (5 mg, 1 equivalent) and P4VP (0.4 mg, 1 equivalent) were taken in NMR tube. Deutarated chloroform (CDCl$_3$, 1 ml) was added to the NMR tube and shaken well. To make homogeneous solution NMR tube was heated at 45° C. and shaken repeatedly. The $^1$HNMR spectra of the complex showed two adjacent peaks at 8.76 and 8.73 ppm corresponding to eight protons of perylene aromatic core and two protons of pyridine ring of P4VP. Also two protons of P4VP were merged with six aromatic protons of UPDPHAPDP-PBI. Acrylate peak for three protons were preserved at 6.53 to 5.67 ppm regions as multiplate.

FIG. 5 $^1$HNMR spectra of UV cured supramolecular polymer complex. Peaks corresponding to acrylate moiety reduced in intensity indicating polymerization. The complete disappearance of the acrylate peaks was taken as the completion of polymerization.

FIG. 6 TEM image of UPDPHAPDP-PBI, complex before curing and complex after curing. Samples for TEM image were prepared in DMF with the concentration of 2 mg/mL Each sample was dropped on TEM grid and allowed to settle down in desiccator. TEM grids were kept in oven at 60° C. for 24 hours without applying vacuum. Dried TEM grids were stained with $I_2$ vapours for 3 hours to improve the contrast. TEM image of UPDPHAPDP-PBI did not shown any specific pattern and observed to be powder like nature. Absence of ordering in TEM image of UPDPHAPDP-PBI indicates poor self assembling tendency. TEM image of complex before UV curing experiment showed polymeric fringes in which dark lines corresponding to polar P4VP region and bright lines related to nonpolar unsymmetrical perylene bisimide part. Hydrogen bonding assists the formation of well ordered pattern. After UV curing experiment TEM image showed similar polymeric fringes with better long range ordering. Polymeric fringes pattern after UV curing found to be thinner than before UV curing experiment. This shows that the curing experiment influences the better long range ordering with decreased distance between lines.

FIG. 7 Solution state $^1$HNMR (400 MHz) spectra of OPV, UODAp-PBI and OPV-UODAp-PBI complex. UODAp-PBI has 8 protons at 8.59 ppm corresponding to Perylene aromatic core. The pyridine aromatic protons appear at 7.44 and 8.88 ppm as doublet which upon complexation with OPV molecule shift in the range of 8-6.9 ppm and merge with aromatic protons of the OPV molecule.

DETAILED DESCRIPTION

Figure 1:
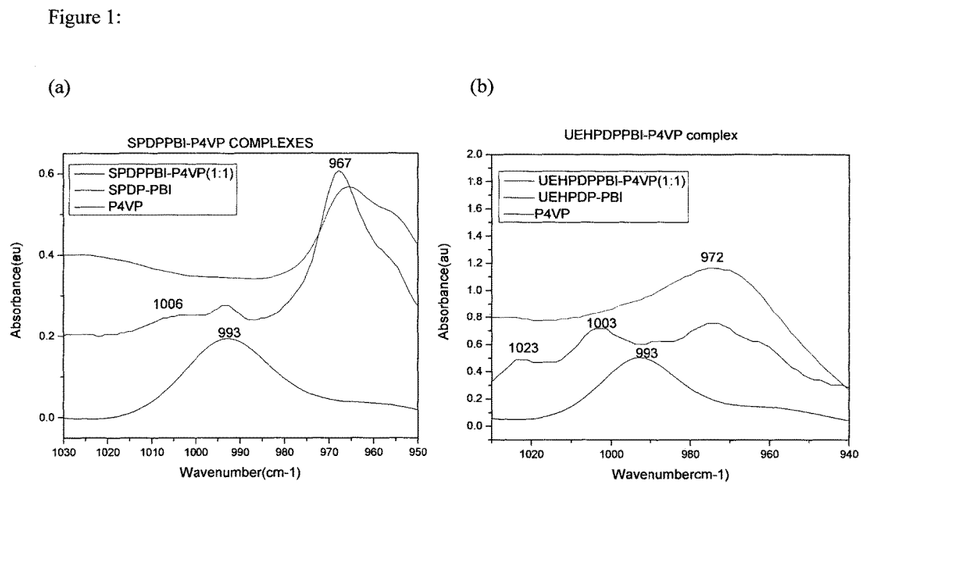
Figure 2:
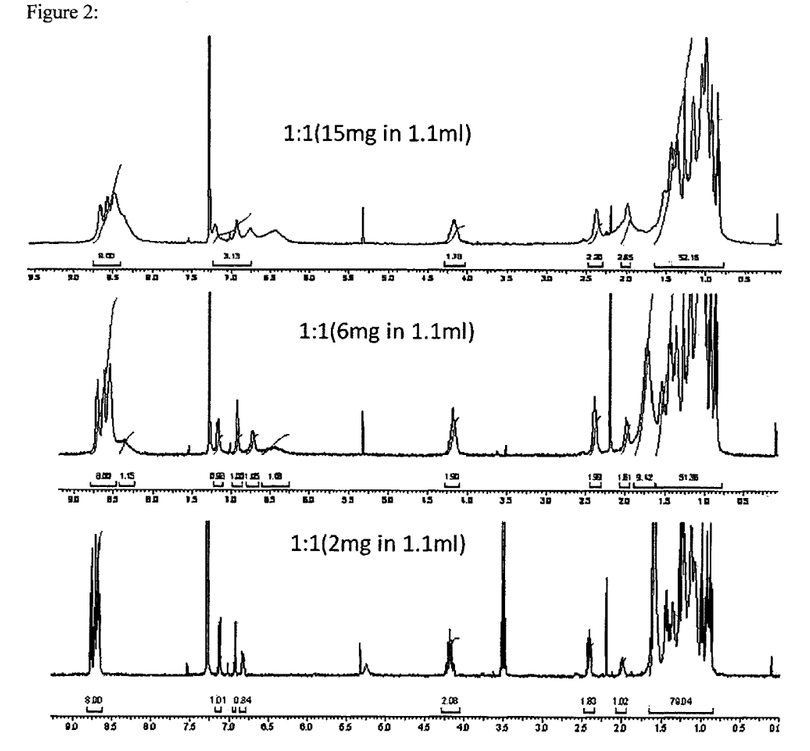
FIG. 2 Concentration dependent solution state (400 MHz) $^1$HNMR studies of UEHPDP-PBI-P4VP complex. Hydrogen bonding is a concentration dependent phenomena and therefore the degree of hydrogen bonding in the above mentioned complexes should vary steadily as a function of concentration.
Figure 3:
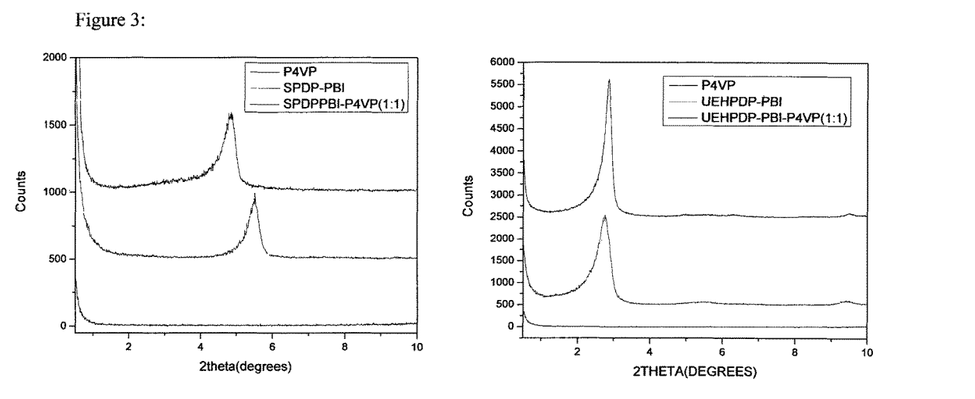
FIG. 3 Low angle X-Ray Diffraction analysis of UEHPDP-PBI and SPDP-PBI complexes with P4VP.
Figure 4:
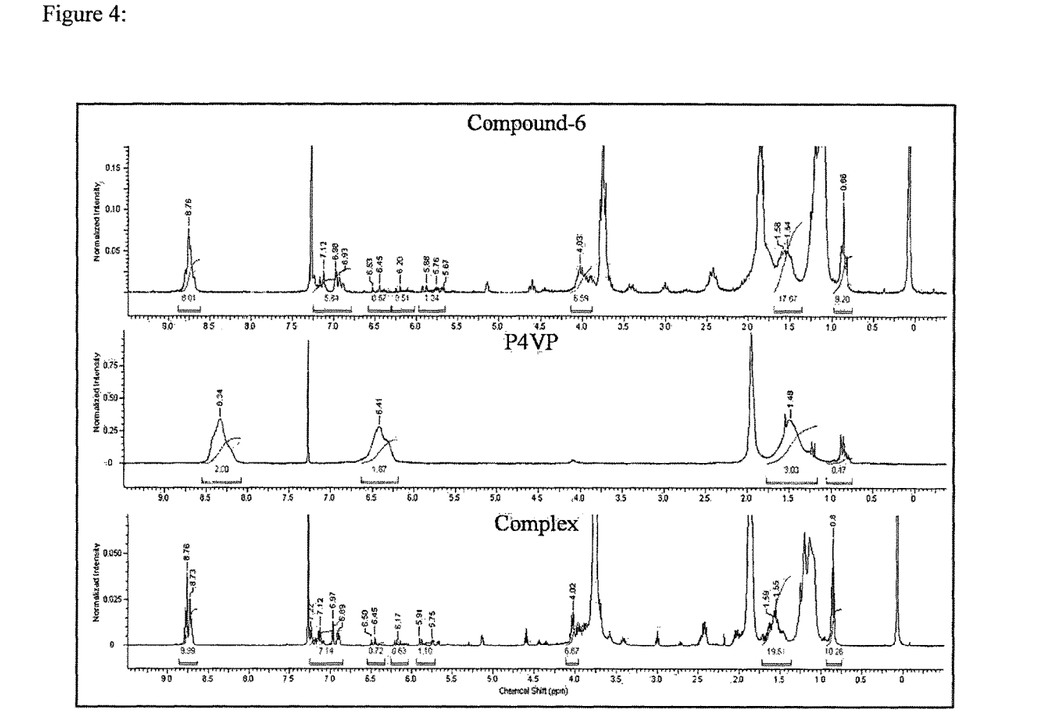
Figure 5:
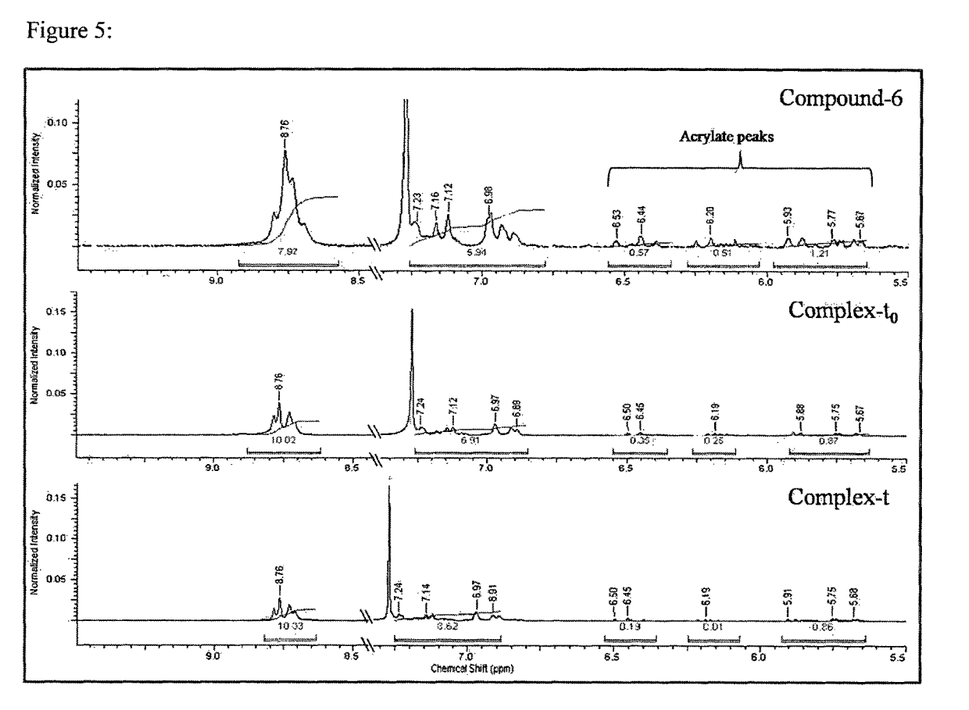
Figure 6:
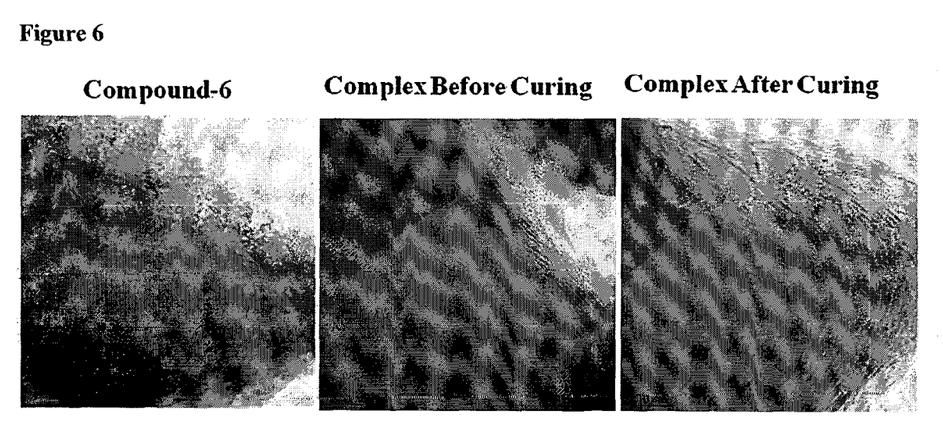
Figure 7:
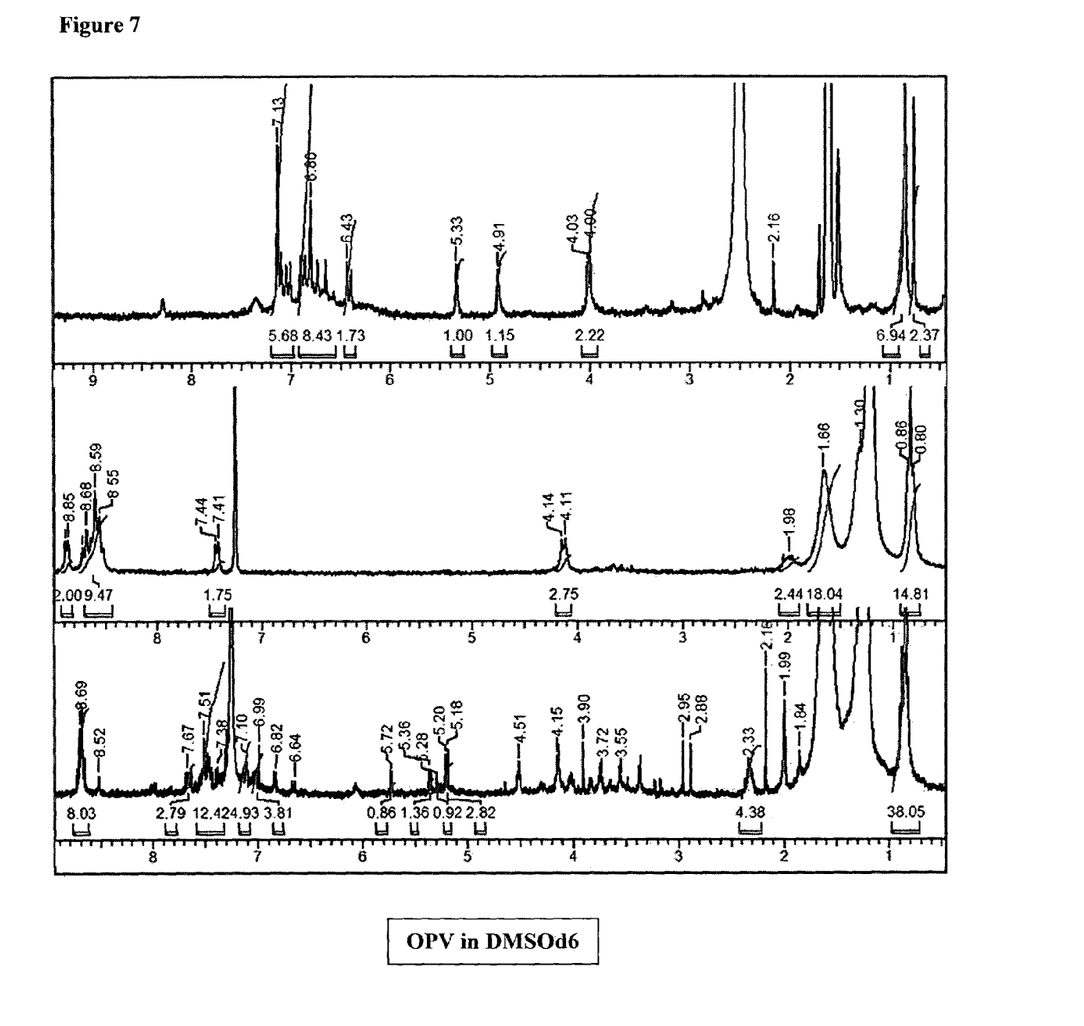
Figure 8:
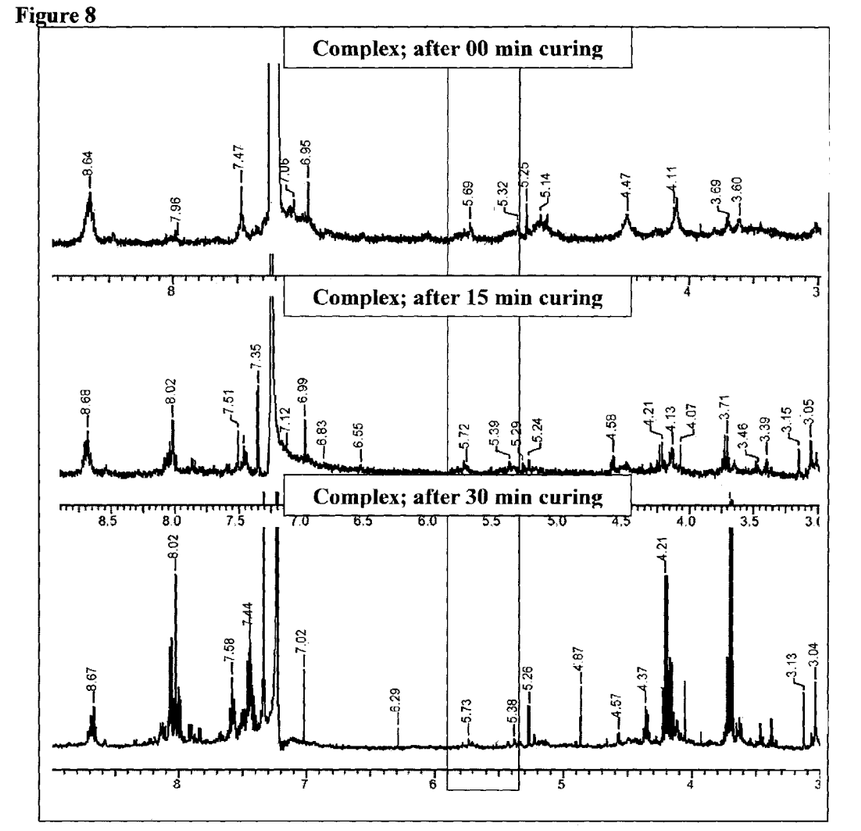
FIG. 8 $^1$HNMR spectra of UV cured supramolecular OPV-UODAp-PBI polymer complex. Peaks corresponding to acrylate moiety reduced in intensity indicating polymerization. The complete disappearance of the acrylate peaks was taken as the completion of polymerization.
Figure 9:
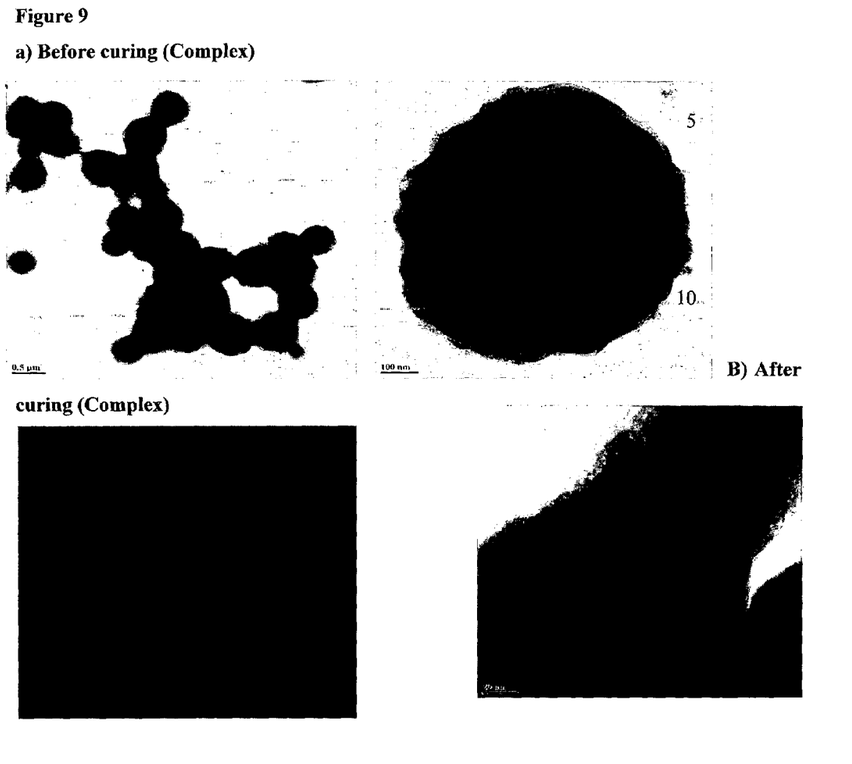
FIG. 9 The OPV-UODAp-PBI supramolecular complex self assembled in spheres as seen from the TEM images before curing. After UV induced polymerization, the spherical assembly had completely disappeared and the polymer complex exhibited sheet like structure indicating higher order organization.

The present invention provides Perylenebisimide (PBI) and naphthalene bisimide (NBI) derivatives and oligophenylene vinylene (OPV) derivatives, photoactive materials that are used in OFETS and solar cells.

In one aspect, the invention discloses supramolecular complex formation between PBI derivatives and hydrogen bondable preformed commercially available polymers such as poly(4-vinyl pyridine) [P4VP], Polystyrene-b-poly(4-vinyl pyridine) (PS-b-P4VP), Poly(acrylic acid) (PAA), Polystyrene-b-Poly(acrylic acid) (PS-b-PAA), Poly(vinyl phenol) (PVPh) or Polystyrene-b-Poly(vinyl phenol) (PS-b-PVPh).

The PBI was functionalized in such a way as to have supramolecular complex formation possible only at one termini, or at both termini which then resulted in non-covalently crosslinked supramolecular complex.

The supramoleculary organized PBI was then subjected to polymerization (by photocuring). The formation of the hydrogen bonded supramolecular polymer PBI was proven by various experimental techniques like FTIR, $^1$H NMR spectroscopy, and WXRD.

Hydrogen bonded complex formation was not possible with PBI which were not suitably functionalized.

In another aspect of the invention, suitably functionalized oligophenylene vinylene (OPV) derivative was complexed by hydrogen bonding interaction with complementarily functionalized perylenebisimide derivative. This donor-acceptor supramolecular complex was further subjected to photopolymerization to obtain donor-acceptor polymer complex.

The formation of hydrogen bonded supramolecular OPV-PBI donor-acceptor complex was confirmed by experimental techniques like $^1$H NMR spectroscopy. The polymerization of this supramolecular complex was also confirmed by $^1$H NMR spectroscopy. Microscopic techniques like Transmission Electron Microscope (TEM) confirmed the higher ordering in the supramolecular complex after polymerization.

Poly(4-vinyl pyridine) P4VP has a basic nitrogen atom which can form hydrogen bonding linkage with proton donating units such as hydroxyl, carboxyl and such like. For the complexing system comprising long alkyl chains with strong hydrogen bonding such systems are considered as comb-coil polymers. The hydrogen bonding is a direction specific interaction. If the hydrogen bonding is coupled with the natural tendency of aromatic moieties like perylene or naphthalene bisimides (PBI/NBI) to form pi stacking interactions then this can result in hierarchical organization of PBI/NBI.

The invention discloses P4VP/PBI supramolecular complexes to form comb-coil structures of PBI and P4VP.

The suitably functionalized PBI derivatives are selected from symmetrical or unsymmetrical PBI derivatives, with one of the functionalities being hydroxyl group or carboxyl group suitable for hydrogen bonding interaction with P4VP.

The synthesis of PBI containing supramolecular complex, followed by crosslinking is shown below in scheme 1.

Scheme 1

R, R' = H, OH, (meth)acrylate,
X = aliphatic or aromatic spacer crosslinked PBI within P4VP template The PBI containing polymer thus obtained would be further evaluated for its applications in OFET and solar cells.

A facile process for the preparation of self-organized cross-linked perylene bisimide nanostructures comprising:
a. complexing the perylene bisimide derivative with poly-4-vinyl pyridine or OPV in 1:1, 1:0.75, 1:0.50, 1:0.25 mole ratio presence of solvent at a temperature of 30-60° C. to give comb-coil supramolecular complex;
b. Photoinitiated polymerization of comb-coil supramolecular complex in presence of photoinitiator to obtain said self-organized non-covalently cross-linked perylene bisimide nanostructures.

The perylene bisimide derivative for the facile process disclosed herein is selected from the group consisting of symmetrical pentadecylphenyl perylene bisimide [SPDP-PBI], and unsymmetrical pentadecylphenyl perylene bisimide.

The unsymmetrical pentadecylphenyl perylene bisimide is ethyl-hexyl pentadecylphenyl perylene bisimide [UEHPDP-PBI].

The unsymmetrical pentadecylphenyl perylene bisimide is alkyl or aryl methacrylate derivative of said pentadecylphenyl perylene bisimide.

The OPV is unsymmetrical OPV with a H bonding group selected from —OH, —COOH at one end and a polymerizable group selected from acrylate or methacrylate group at the other end.

The perylene bisimide possesses linear or branched C6-C20 alkyl chain at one end and the other end is an amino pyridine group.

The following examples are given by way of illustration of the present invention and should not be construed to limit the scope of the present invention.

EXAMPLES

Example 1

Synthesis of Comb-Coil Supramolecular Complex of P4VP and Unsymmetrical PBI (UEHPDP-PBI) (where R'=Branched Alkyl Chain and R=Pentadecyphenol)

Sample Preparation:

poly4-vinyl pyridine (P4VP) (10 mg) and UEHPDP-PBI (unsymmetrical ethylhexylpentadecylphenyl) (76 mg) were dried at 60° C. in vacuum oven for 2 days and stored in vacuum dessicator. UEHPDP-PBI was first dissolved in dimethyl formamide (DMF) (0.8 wt %) until a clear solution was obtained. P4VP was added subsequently followed by mechanical stirring for 1 hr at 60° C., until clear solution was got. DMF was then evaporated on a hot plate at 70° C. The complexes were then dried at 60° C. in vacuum oven to remove traces of DMF, thereafter stored in dessicator.

Example 2 Synthesis of Supramolecular Crosslinkable Complex of P4VP and Symmetrical PBI (SPDP-PBI) (where R'=R=Pentadecylphenol)

Sample Preparation:

P4VP (10 mg) and SPDP-PBI (symmetricalpentadecylphenyl) (47 mg) were dried at 60° C. in vacuum oven for 2 days and stored in vacuum dessicator. SPDP-PBI was first dissolved in DMF (0.8 wt %) until a clear solution was obtained. P4VP was added subsequently followed by mechanical stirring for 1 hr at 60° C., until clear solution was got. DMF was then evaporated on a hot plate at 70° C. The complexes were then dried at 60° C. in vacuum oven to remove traces of DMF, thereafter stored in dessicator.

Example 3

Synthesis of Supramolecular Crosslinkable Complex of P4VP and Unsymmetrical PBI (where R'=acrylate moiety and R=Pentadecyphenol)

Sample Preparation:

P4VP (0.4 mg) and unsymmetrical PBI (UPDPHAPDP-PBI) with the polymerizable acrylate moiety (5 mg) were dissolved in dry DCM (2 ml). Solution was heated at 50° C. for 1 hour to obtain homogeneous solution. Stirring was continued at room temperature under inert atmosphere for 24 hours. The complex was dried in vacuum oven and stored in dessicator.

Example 4 UV Induced Polymerization of P4VP-PBI Complex

Sample Preparation:

The UV curing was carried out in an NMR tube. To the NMR tube containing complex UPDPHAPDP-PBI (5 mg) in 1 ml $CDCl_3$, photoinitiator (2,2-diethoxy acetophenone) (5 wt %) was added and $^1$HNMR spectra was recorded before curing experiment. The NMR tube was kept under UV probe and irradiated for 15 minute with the interval of 10 seconds using DYMAX Blue wave 75 UV curing spot lamp provided with a light guide of 5 mm diameter and a 75 watt high pressure short-arc bulb with an initial lamp intensity of 19 $W/cm^2$ emitting primarily in the UVA and blue visible light range of 280-450 nm to ensure complete reaction of acrylate moiety. Resultant solution was subjected for $^1$HNMR analysis.

P4VP-PBI complex

P4VP-Poly(PBI) complex

UV cure

Example 5 Synthesis of Supramolecular Crosslinkable Complex of OPV Containing Polymerizable Methacrylate Moiety at One End and Phenolic Group at the Other End and Unsymmetrical PBI (UODAp-PBI) Containing Hydrogen Bondable Pyridine Unit at One End and Branched Alkyl Chains at the Other End

Sample Preparation:

oligophenylene vinylene (OPV) (2.8 mg) and UODAp-PBI (unsymmetrical octyl dodesyl aminopyridine) (5.3 mg) were dried at 60° C. in vacuum oven for 2 days and stored in vacuum dessicator. UODAp-PBI and OPV were first dissolved in dimethyl formamide (DMF) at 90° C. until a clear solution was obtained followed by two days stirring at 65° C. DMF was then evaporated inside the vacuum desecrator at room temperature. The complexes were then dried at 60° C. in vacuum oven to remove traces of DMF and stored in dessicator.

Example 6 UV Induced Polymerization of P4VP-UODAp-PBI Complex

Sample Preparation: The UV Curing was Carried Out in an NMR Tube.

To the NMR tube containing complex (5 mg) in 1 ml CDCl$_3$, photoinitiator (2,2-diethoxy acetophenone) (5 wt %) was added and $^1$HNMR spectra was recorded before curing experiment. The NMR tube was kept under UV probe and irradiated for 15 minute with the interval of 10 seconds to ensure complete reaction of acrylate moiety. Resultant solution was subjected for $^1$HNMR analysis.

ADVANTAGES OF THE INVENTION

Short process to arrive at described nano structures
Process is simple and facile
Rate and efficiency of polymerization is faster
The crystallinity of nano structures is retained

We claim:

1. A facile process for the preparation of self-organized non-covalently cross-linked perylene bisimide nanostructures comprising:
   a) complexing pentadecylphenol perylene bisimide with poly-4-vinyl pyridine or oligophenylene vinylene (OPV) in presence of solvent under stirring for a period ranging between 2 to 24 hrs at a temperature of 30-60° C. to give comb-coil supramolecular complex;
   b) photoinitiated polymerization of comb-coil supramolecular complex as obtained in step (a) in presence of photoinitiator under UV radiation for a period ranging between 5-15 mins at interval ranging between 5-90 seconds using a UV curing spot lamp to obtain said self-organized cross-linked perylene bisimide nanostructures.

2. The process according to the claim 1, wherein the pentadecylphenol perylene bisimide used in step (a) is selected from the group consisting of symmetrical pentadecylphenol perylene bisimide [SPDP-PBI], and unsymmetrical pentadecylphenol perylene bisimide.

3. The process according to claim 2, wherein said unsymmetrical pentadecylphenol perylene bisimide is ethyl-hexyl pentadecylphenol perylene bisimide [UEHPDP-PBI].

4. The process according to claim 2, wherein said unsymmetrical pentadecylphenol perylene bisimide is alkyl or aryl methacrylate derivative of said pentadecylphenol perylene bisimide.

5. The process according to claim 1, wherein the pentadecylphenol perylene bisimide possesses linear or branched C6-C20 alkyl chain at one end and the other end is an amino pyridine group.

6. The process according to claim 1, wherein OPV used in step (a) is unsymmetrical OPV with a H bonding group selected from —OH, —COOH at one end and a polymerizable group selected from acrylate or methacrylate group at the other end.

7. The process according to claim 1, wherein solvent used in step (a) is selected from the group consisting of chloroform, dichloromethane, dimethylformamide, tetrahydrofuran.

8. The process according to claim 1, wherein the photo initiator used in step (b) is 2,2-diethoxy acetophenone.

9. The process according to claim 1, wherein mol ratio of pentadecylphenol perylene bisimide and poly-4-vinyl pyridine or oligophenylene vinylene is in the range of 1:0.25 to 1:1.

10. The process according to claim 1, wherein size of self-organized cross-linked perylene bisimide nanostructures is in the range of 5-15 nm.

11. The process as claimed in claim 1, wherein said comb coil supra molecular complex comprises a polymerizable functionality selected from the group consisting of acrylates or methacrylates at one end.

* * * * *